Aug. 13, 1968  R. Q. SHELTON ET AL  3,396,926
HITCH FOR PIGGYBACK TRAILER CAR
Filed Sept. 28, 1966  3 Sheets-Sheet 3
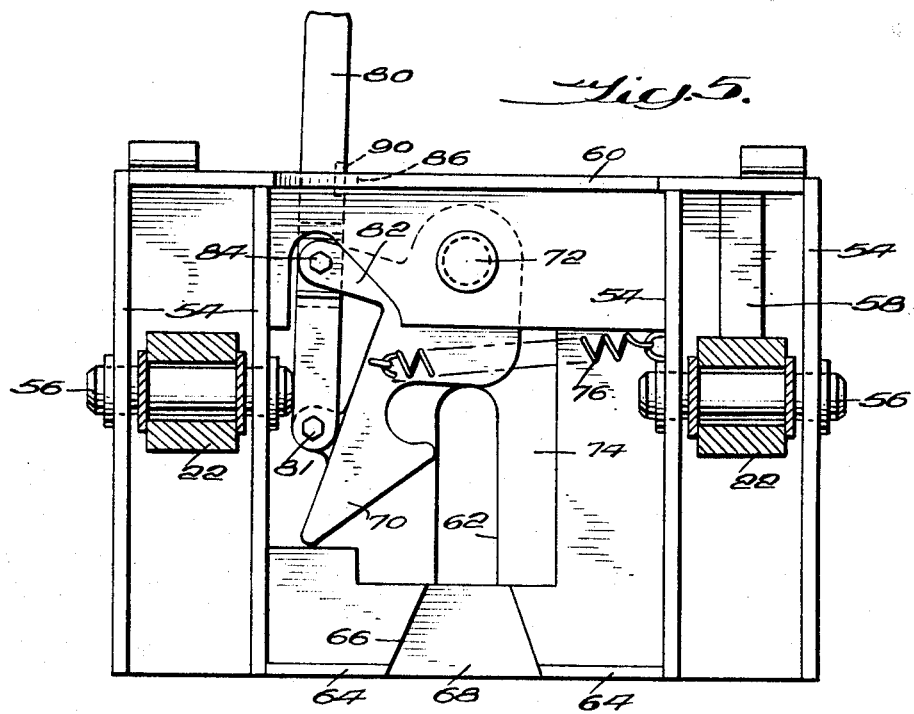
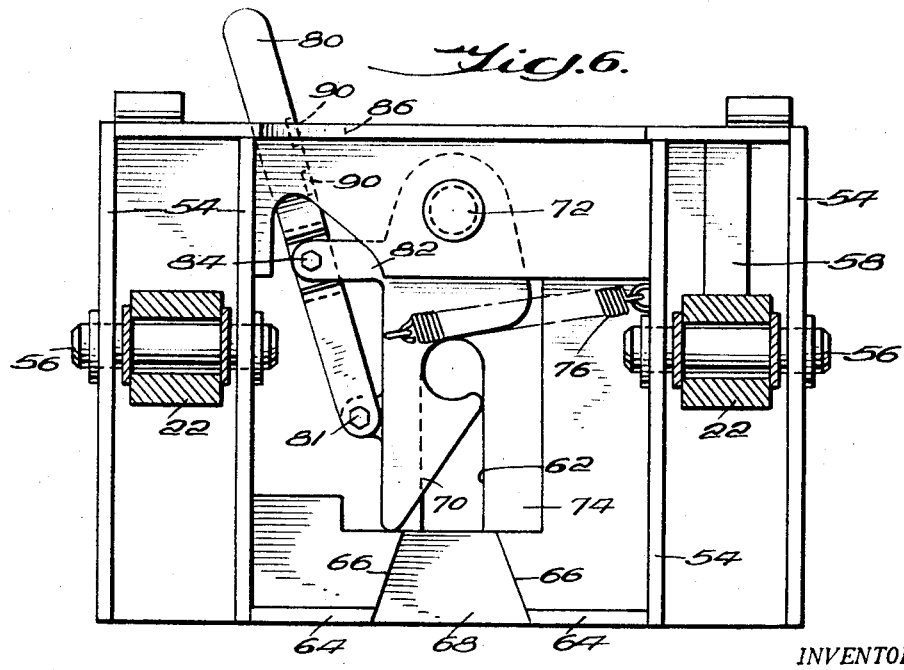
INVENTORS
ROBERT Q. SHELTON,
O. ELWYN SEAY,
BY
Burns, Doane, Benedict, Swecker & Mathis
ATTORNEYS

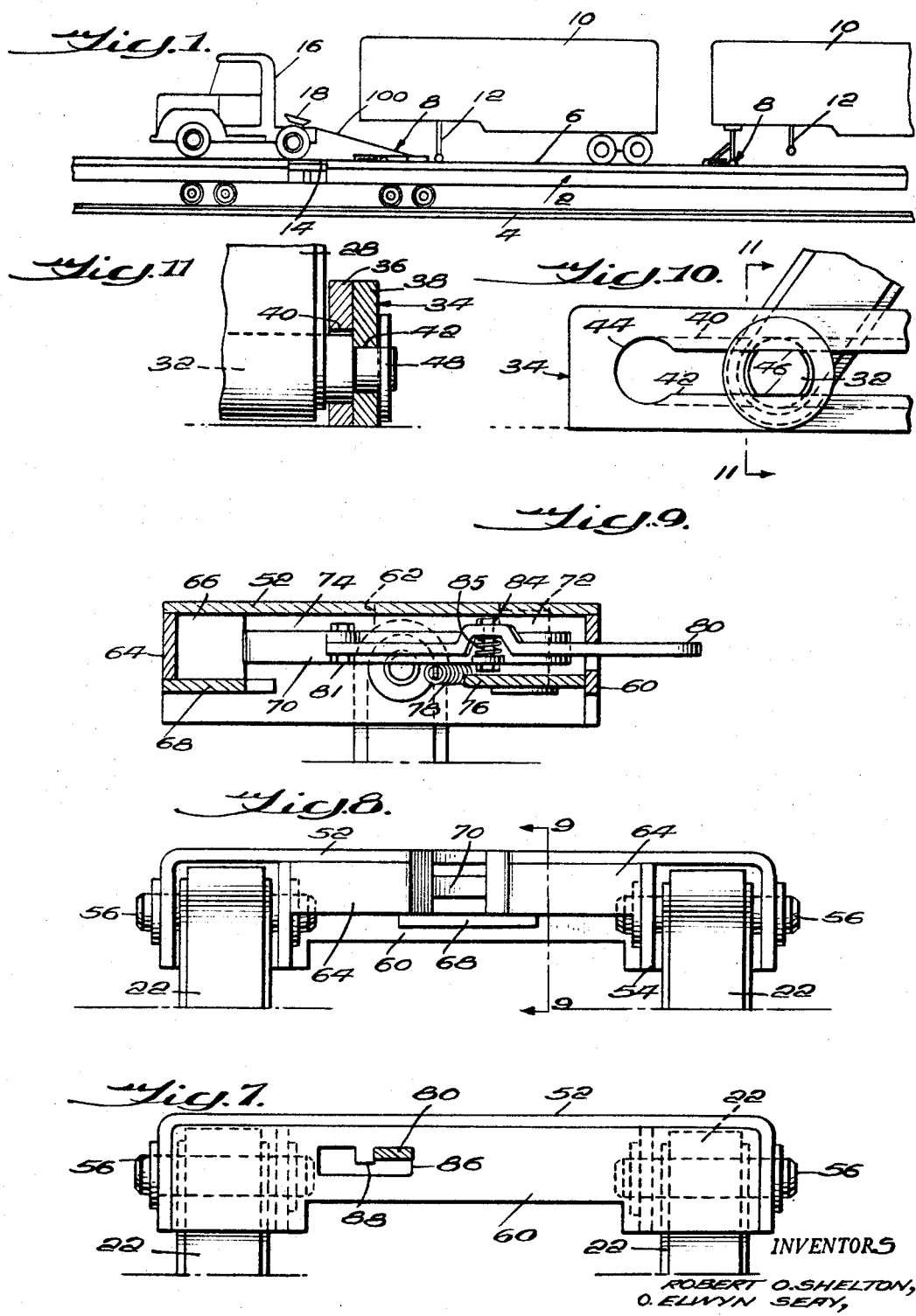

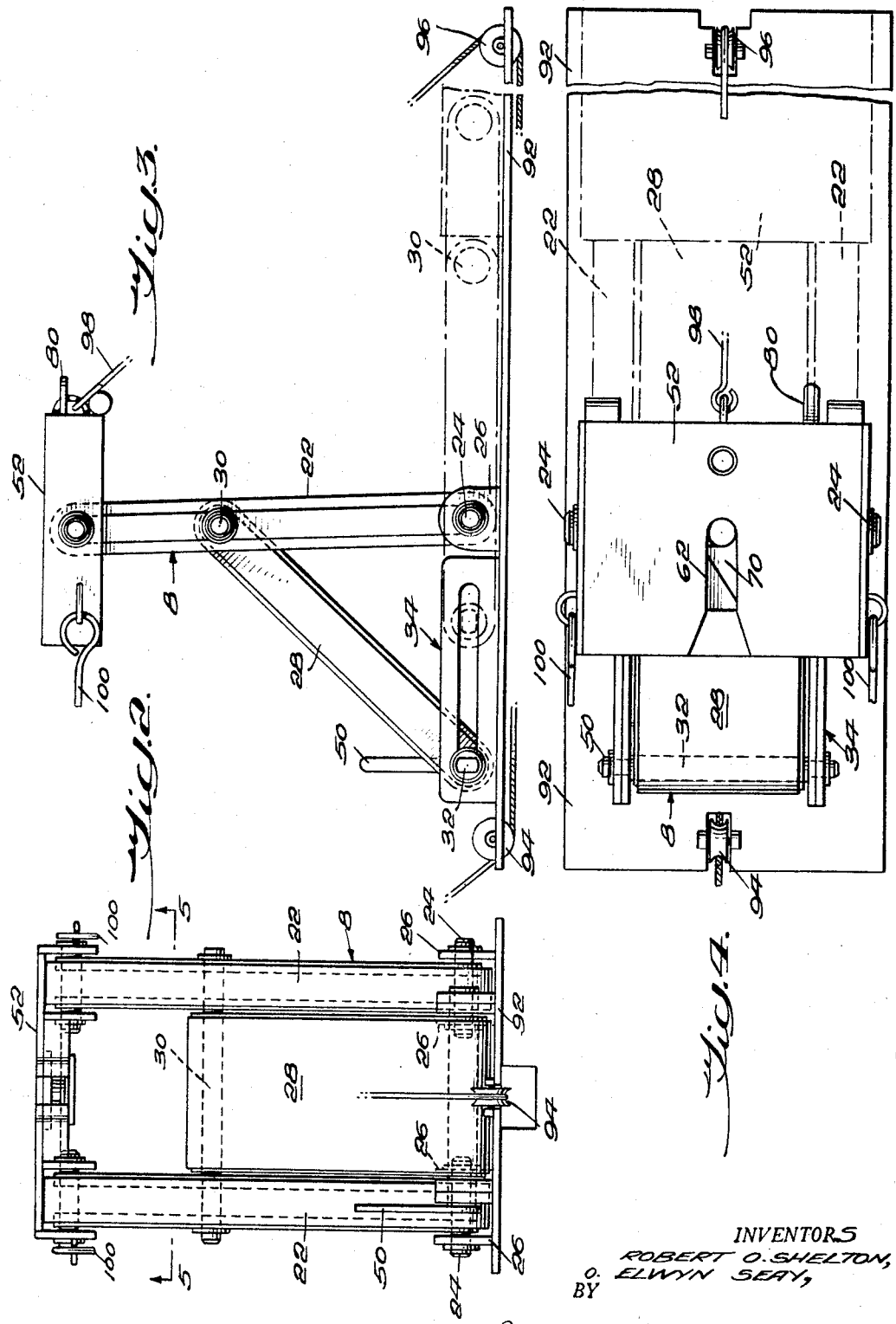

United States Patent Office 3,396,926
Patented Aug. 13, 1968

3,396,926
HITCH FOR PIGGYBACK TRAILER CAR
Robert Q. Shelton and Orum E. Seay, Duncan, Okla., assignors to Halliburton Company, Duncan, Okla., a corporation of Delaware
Filed Sept. 28, 1966, Ser. No. 582,622
10 Claims. (Cl. 248—119)

ABSTRACT OF THE DISCLOSURE

A stanchion for securing truck trailers on railway flatcars. The stanchion is collapsible and has a pair of support legs hingedly mounted on the base plate, with a brace hingedly mounted between the legs. The lower end of the brace is guided along a horizontal slot in upright brackets that are secured to the floor on opposite sides of the brace. When the lower end of the brace is positioned against an abutment at the outer end of the slot, the support legs are inclined slightly from the vertical in a direction to urge the lower end of the brace against the abutment. Thus, the load of the trailer on the legs maintains the stanchion in a locked position.

---

This invention relates to the transportation of truck trailers on railway cars, and more particularly to apparatus for temporarily securing truck trailers to railway cars.

A conventional trailer truck is made up of a trailer and a tractor which have an articulated connection between them. The tractor is a four-wheel vehicle with a horizontal bearing plate, called a fifth-wheel assembly, mounted on the rear of the tractor. A downwardly projecting kingpin on the undersurface of the trailer cooperates with the fifth-wheel assembly for hitching the trailer and tractor together. The weight of the forward end of the trailer is supported on the tractor fifth-wheel assembly.

Usually the trailer is provided with a pair of landing legs that are mounted at the forward end of the trailer, but rearwardly of the kingpin. The landing legs are hingedly mounted on the trailer, or are mounted in telescoping relation, so that the ground engaging portion of the landing legs may be raised above the ground while the trailer is supported on the tractor.

Truck trailers have been transported on railway cars by supporting the forward end of the trailer on a stanchion which secures the trailer in place on the railway car. These stanchions have a support plate that resembles a tractor fifth-wheel assembly. Usually the stanchions fold flat on the surface of the railway car to allow the trailer and tractor to pass over the stanchion while the trailers are being moved across the surface of the flat cars. Due to the jerking motion of the railway cars during starting and stopping of the train and the lateral sway of the cars on curves, the trailers must be rigidly secured to the stanchions.

Since the stanchions must support loaded trailers, the stanchions are of such heavy construction that they cannot be erected and collapsed manually. Some auxiliary means must be provided for raising and lowering the stanchion. Furthermore, the stanchion when collapsed must not interfere with the movement of the trailers over the surface of the railway cars.

Accordingly, it is an object of this invention to provide an improved stanchion for temporarily securing trailers on railway cars.

It is a further object of this invention to provide a stanchion which may be quickly and easily operated for securing trailers to railway cars.

It is a further object of this invention to provide a trailer stanchion which does not obstruct the load bearing surface of the railway car.

These objects are accomplished in accordance with a preferred embodiment of the invention by a collapsible stanchion that is rigidly secured on the support surface of a railway car. A hitch assembly on the stanchion has a latch which engages the trailer kingpin and a bearing plate on the stanchion supports the front end of the trailer. The spring loaded latch is operated by a lever for releasing the kingpin. The bearing plate is mounted for swinging movement in a vertical plane on a pair of legs. A brace is connected with the legs at one end, and the opposite end is mounted for sliding movement in a horizontal slot in a bracket secured to the surface of the railway car. A pin on the brace extends into the slot and cooperates with the slot to lock the brace at one end of the slot when the stanchion is erected. The legs on which the hitch assembly is mounted slope in the opposite direction from the brace, and therefore, the load of the trailer on the legs maintains the lower end of the brace in the locked end of the slot. When the stanchion is collapsed on the surface of the railway car, the bearing plate, the brace and the legs fold together so that the stanchion projects only a minimum distance above the surface of the car.

This preferred embodiment is illustrated in the accompanying drawings in which:

FIG. 1 is a schematic view of a railway car having the stanchions of this invention mounted thereon;

FIG. 2 is a front elevational view of a stanchion in its raised position;

FIG. 3 is a side elevational view of the stanchion;

FIG. 4 is a top plan view of the stanchion;

FIG. 5 is a cross sectional view of the stanchion along the line 5—5 in FIG. 2;

FIG. 6 is a cross sectional view of the stanchion as in FIG. 5, but in latched position;

FIG. 7 is a rear elevational view of the bearing plate;

FIG. 8 is a front elevational view of the bearing plate;

FIG. 9 is a cross sectional view of the bearing plate along the line 9—9 in FIG. 8;

FIG. 10 is a detail side elevational view of the brace guide bracket; and

FIG. 11 is a cross sectional view of the brace bracket along the line 11—11 in FIG. 10.

Referring to FIG. 1, a railway flatcar 2 is mounted on conventional railroad tracks 4. The railway car 2 has a flat support surface 6, and the stanchions 8 of this invention are rigidly secured to the surface of the railway car 2, approximately midway of the width of the car surface 6.

Trailers 10 are positioned on the railway car 2. The front end of each trailer is supported by a stanchion 8 and a conventional kingpin on the trailer is latched in engagement with the stanchion to prevent longitudial movement of the trailer relative to the car 2. The trailer 10 also has landing legs 12 at the forward end for supporting the trailer, when it is disconnected from the stanchion 8 or from a tractor which hauls the trailer over the highway. The landing legs 12 are adjustable vertically, so that when the front end of the trailer is supported on a tractor, the legs may be raised out of engagement with the ground.

Temporary bridging elements, shown schematically at 14, are positioned between the ends of the flatcars to permit the trailers and the tractors to pass from one car to the next until the trailer is positioned on the appropriate flatcar. In FIG. 1, a typical tractor 16 having a fifth-wheel assembly 18 may be used for shuttling the trailers 10 from the loading platform onto the railway cars. The trailer kingpin 20 is hitched to the assembly 18.

The stanchion 8, as shown in FIGS. 2, 3 and 4, is movable from a collapsed position flat on the surface 6 of the railway car 2 to a raised position for supporting the front end of the trailer 10. The stanchion includes a pair of legs 22 which are journaled for vertical swinging movement on pins 24. The pins 24 are supported between brackets 26 that are rigidly secured to the surface of the railway car 2. A brace 28 is hingedly mounted at the upper end on a bar 30 which extends between the legs 22. At the lower end of the brace 28, there is a transverse bar 32 which is journaled in the brace for rotational movement relative to the brace 28. The opposite ends of the bar 32 extend through slots in upright brackets 34.

Referring to FIGS. 10 and 11, the brackets 34 include a pair of plates 36 and 38. The plate 36 adjacent the brace 28 has a slot 40 of a slightly larger width than the diameter of the bar 32. The slot in the outer plate 38, however, has a narrow portion 42 and an enlarged portion in the form of a circular opening 44 at the end of the slot 42 farthest away from the bracket 26. The enlarged portion 44 has substantially the same diameter as the width of the slot 40. The enlarged portion 44 and the slot 40 are large enough to permit the bar 32 to pass therethrough. The outer end of the bar 32 has been machined to form opposed flat surfaces 46 and the diametrical distance between the surfaces 46 is substantially less than the diameter of the bar 32, but it is only slightly less than the width of the narrow slot portion 42. The end of the bar 32 has a washer 48 that is rigidly secured on the bar to prevent the bar from being displaced out of the bracket 34. Although only one of the brackets 34 is shown in FIGS. 10 and 11, both of the brackets have substantially the same structure.

A handle 50 is rigidly secured to the end of the bar 32 for rotating the bar relative to the brace 28. In the position shown in FIG. 3, the flat surfaces 46 of the bar 32 are out of alignment with the narrow slot portion 42, and thus the bar 32 cannot enter the narrow slot portion 42. When the handle 50 is rotated clockwise approximately 90°, the flat surfaces 46 on the bar 32 are aligned with the slot 42, as shown in FIG. 10, and thus the bar may move longitudinally through the slot portion 42. The portion of the bar 32 that is in the slot 40 supports the outer end of the bar and when the flat surfaces 46 enter the enlarged portion 44, the slot 40 prevents the end of the bar from dropping to the bottom of the portion 44. Thus, there is no need to lift the bar as it moves from the enlarged portion 44 to the narrow portion 42.

As shown in FIGS. 3 and 4, the legs 22 do not extend vertically upward when the bar 32 of the brace 28 is positioned in the circular portion 44 of the slot. The legs 22 slope forwardly preferably 2° to 3° from the vertical. Due to this forward slope of the legs 22, a downward load on the upper end of the legs 22 urges the lower end of the brace 28 outwardly relative to the hinge pins 24, and thus retains the bar 32 in the circular portion 44.

A bearing plate 52 is mounted on the upper end of the legs 22 for supporting the undersurface of a trailer 10. A pair of frame members 54 under the bearing plate 52 support bearing pins 56 which extend through the upper ends of the legs 22. The pins 56 permit the legs 22 to swing relative to the pins, and thus the bearing plate 52 is free to rotate about a horizontal axis through the pins 56. A stiff flat spring 58 projects outwardly from the rear plate 60 and abuts against the side of one of the legs 22 to restrict rotational movement of the bearing plate relative to the legs. The spring 58 causes the bearing plate 52 to be positioned approximately horizontal when the legs are in upright position, but permits the plate to swing into alignment with the legs 22 when the legs have been lowered to the surface of the car 2, as shown in dotted lines in FIG. 3.

The bearing plate 52 includes a slot 62 for receiving the kingpin of a trailer 10. A front plate 64 extends between the frame members 54. The front plate 64 has guide portions 66 which are secured under the surface of the plate 52 on opposite sides of the slot. A reinforcing plate 68 extends between the guide portions 66, as shown in FIGS. 5, 8 and 9.

A trailer kingpin K (FIG. 9) is temporarily secured at the closed end of the slot 62 by a latch 70 which is mounted for swinging movement on a hinge pin 72. A reinforcing plate 74 is rigidly secured to the bottom of the plate 52 and has a slot aligned with the slot 62. The pin 72 extends through a web member 76 projecting outwardly from the rear plate 60, through the reinforcing plate 74, and through the bearing plate 52. The reinforcing plate 74 and the plate 76 cooperate to support the latch 70 and to maintain it in parallel relation with the reinforcing plate 74 during swing movement of the latch 70. The latch 70 is biased toward a closed position by a spring 78.

A lever 80 is connected with the latch to swing the latch away from the slot 62, thereby allowing the kingpin K to move out of the closed end of the slot 62. The lever 80 is hingedly attached at one end 81 to the rear edge of the latch 70. An arm 82 extends outwardly from the latch adjacent the hinge pin 72 and is connected with the lever 80, by a bolt 84. A coil spring 85 on the bolt 84 urges the lever upwardly relative to the arm 82, as shown in FIG. 9.

The lever 80 extends through a slot 86 in the back plate 60. The slot 86 is approximately twice the width of the lever 80 and has a lug 88 projecting down from the top of the slot. The lever 80 may pass around the lug 88, but it is urged upwardly by the spring 85. The lever 80 has a pair of notches 90 and the width of the lever between the bottom of the notches 90 and the opposite edge of the lever corresponds to the distance between the lug 88 and the opposing end of the slot 86. When the latch 70 is open, as shown in FIG. 5, the inner notch 90 is aligned with the slot 86 in the back plate 60 and the spring 85 urges the lever 80 upwardly into the position shown in FIG. 7. Thus, the lever is retained in engagement with the back plate 60 until the end of the lever is manually depressed to release the lever.

In order to raise and lower the stanchion, a passage is provided between the stanchion and the surface of the railway car to allow a cable to pass under the stanchion from the rear to the front end of the stanchion. The stanchion may be mounted on a base plate 92 which extends rearwardly of the leg supporting brackets 26 a greater distance than the length of the legs 22, so that the bearing plate 52 lies on the base plate 92 when the stanchion is in collapsed position, as shown in dotted lines in FIG. 3. A pulley 94 is mounted at the front end of the base plate 92 and a similar pulley 96 is mounted at the rear end of the base plate 92. The pulleys 94 and 96 are in substantial alignment as shown in FIG. 4. A cable 98 is secured to the rear plate 60 of the bearing plate assembly 52 and the cable 98 passes over the pulley 96, under the plate 92 to the front pulley 94, where it is in position to be attached to the tractor 16 on the surface of the railway car 2. Cables 100 are attached to opposite sides of the bearing plate 52 by brackets, as shown in FIGS. 3 and 4. The cables 100 extend forwardly in position to be connected to the tractor 16 for raising the stanchion.

In operation, the stanchions 8 are collapsed on the surface of an empty railway car 2. A trailer 10 is hitched to a tractor 16 by engagement of the kingpin on the trailer with the fifth-wheel assembly on the tractor. The tractor moves the trailer along the surface of the railway car in the train until it is located at the desired position over one of the stanchions 8. The landing legs 12 are then lowered to support the front end of the trailer 10, while the tractor is disconnected from the trailer. The tractor then moves forward a short distance and the cable 100 is attached to a portion of the tractor 16. The tractor is then driven forward to pull the bearing plate 52 and the legs 22 to a raised position, as shown in FIG. 3. As the legs 22 swing upwardly, the spring 58 (FIG. 5) limits the clockwise rotation of the bearing plate relative to the legs, as viewed in FIG. 3, and the movement of the bearing plate relative to the trailer causes the kingpin to enter the slot 62. Since the legs 22 swing beyond the vertical position, the bearing plate 52 moves downwardly in an arc after the kingpin first enters the slot. This motion provides a locking action to keep the bar 32 in the enlarged portion 44 of the slot until the handle 50 can be rotated. The exposed edge of the latch 70 cooperates with the kingpin to cam the latch to an open position, and thus, the kingpin passes to the closed end of the slot 62. The spring 78 then causes the latch to return to the closed position shown in FIG. 6. When the latch 70 is closed, the kingpin cannot move out of the slot until the latch is manually rotated to an open position. The landing legs 12 are then raised.

When the train has reached its destination, the tractor 16 is positioned in front of the trailer and the end of the cable 98 is attached to the tractor. The handle 50 is moved to position the bar 32 to enter the narrow portion 42, as shown in FIG. 10, after the landing legs have been lowered to support the front end of the trailer. The kingpin is released by moving the lever 80 to the position shown in FIG. 5, and by driving the tractor forward, the cable 98 draws the bearing plate assembly 52 rearwardly, thus causing the legs to swing clockwise, as viewed in FIG. 3. When the stanchion has been collapsed on the surface of the railway car, as shown in dotted lines in FIGS. 3 and 4, the tractor 16 is backed over the stanchion with the wheels straddling the stanchion until the fifth wheel assembly 18 on the tractor 16 engages the kingpin 20. The landing legs 12 may then be raised, so that the weight of the forward end of the trailer is supported on the tractor. The tractor may be driven forward to haul the trailer off of the end of the train.

The stanchion of this invention utilizes the power of the tractor for raising and lowering the stanchion. Due to the sloping relation of the legs 22, in cooperation with the bar 32 and its slot arrangement, the weight of the trailer on the brace bears against the end of the slots and there is no danger of the stanchion collapsing inadvertently. Furthermore, the latch may be readily operated for latching or releasing the kingpin from the slot.

While this invention has been illustrated and described in one embodiment, it is recognized that variations and changes may be made therein without departing from the invention as set forth in the claims.

We claim:
1. A stanchion for securing trailers on railway cars comprising:
   a pair of legs, means mounting the lower end of said legs for vertical swinging movement about a first horizontal axis from a substantially horizontal position through a vertical position, a brace having one end hingedly connected between said legs,
   a bracket adjacent the lower end of said legs, said bracket having a slot extending outwardly from said horizontal axis, said first axis being fixed relative to said bracket,
   a bar projecting laterally from the opposite end of said brace and into said slot, said bar being movable along said slot, said slot having an abutment in position to limit the extent of movement of said bar away from said horizontal axis,
   a bearing plate on the upper end of said legs, said bearing plate being mounted on said legs for vertical swinging movement about a second horizontal axis, said first and second horizontal axes being approximately parallel, and said second axis being offset from said first axis on the side adjacent said bracket when said stanchion is raised and said bar engages said slot abutment, whereby the legs are inclined from a vertical position and a downward load on the bearing plate urges said brace bar against said abutment.

2. A stanchion according to claim 1 wherein said bracket slot is sufficiently long to allow said legs to swing downwardly to a substantially horizontal position.

3. A stanchion according to claim 1 wherein said brace end is connected to said legs at a greater distance from said second horizontal axis than the front of said bearing plate is spaced from said second axis, whereby said bearing plate front and said brace are arranged in end to end relation when said stanchion is collapsed.

4. A stanchion according to claim 1 wherein said bracket slot has a narrow portion, said slot abutment including an enlarged slot portion extending across one end of said slot, said bar being round and having opposed flat surfaces formed on the circumference of said bar, said narrow slot portion having a greater width than the diametrical distance between said surfaces, but a smaller width than the maximum diameter of said bar, and means for selectively rotating said bar relative to said slot, whereby aligning said flat surfaces with said narrow slot portion allows movement of said bar longitudinally in said slot, while misalignment locks said bar in said enlarged slot portion.

5. A stanchion according to claim 4 including a bracket on opposite sides of said brace, said brackets having corresponding narrow and enlarged slot portions, said bar having opposed flat surfaces formed on the circumference of said bar at each opposite end, said bar ends being received in said slot portions, and a handle secured to said bar, whereby movement of said handle rotates said bar.

6. A stanchion according to claim 1 wherein said bearing plate includes an elongated kingpin slot, said kingpin slot extending along the direction of swinging movement of said legs, and latch means on said bearing plate for securing a kingpin in said kingpin slot.

7. A stanchion according to claim 6 including a flat spring secured at one end to said bearing plate, the opposite end of said spring being in position for engaging one of said legs upon erection of said stanchion for limiting swinging movement of said bearing plate about said second horizontal axis.

8. A stanchion according to claim 6 including a latch, means mounting said latch for swinging movement relative to said bearing plate toward and away from said kingpin slot, means biasing said latch toward said kingpin slot, lever means for selectively swinging said latch away from said kingpin slot, and means for temporarily locking said lever against movement relative to said bearing plate.

9. A stanchion according to claim 8 wherein said bearing plate includes a lever slot adjacent said latch, said lever means including a lever extending through said lever slot, one end of said lever being hingedly attached to said latch at a point remote from said latch mounting means, an arm on said latch, means connecting said arm and said lever intermediate the ends of said lever, spring means biasing said lever away from said arm, and abutment means on said lever in position to engage said lever slot when said latch swings away from said kingpin slot, whereby said lever spring maintains said lever abutment in engagement with said slot.

10. A stanchion according to claim 1 including first and second cable means, said first cable means being connected to said bearing plate on one side of said second axis, said second cable means being secured to said bearing plate on the opposite side of said second axis, a first pulley adjacent said bracket, a second pulley positioned on the opposite side of said legs mounting means and spaced from said first pulley, said first cable means extending over said second pulley and said first pulley in series, whereby said first and second cable means lower and raise, respectively, said stanchion by pulling said cable means from the same side of said stanchion.

References Cited

UNITED STATES PATENTS

| | | |
|---|---|---|
| 2,219,415 | 10/1940 | Fontaine. |
| 3,035,801 | 5/1962 | Mangels. |
| 3,189,307 | 6/1965 | Peterson. |
| 3,190,595 | 6/1965 | Ferris. |
| 3,225,707 | 12/1965 | Rollins et al. |

ROY D. FRAZIER, *Primary Examiner.*

R. P. SEITTER, *Assistant Examiner.*